(12) United States Patent
Jeong et al.

(10) Patent No.: US 12,473,034 B2
(45) Date of Patent: Nov. 18, 2025

(54) SUSPENSION SUPPORT STRUCTURE FOR MONOCOQUE VEHICLE

(71) Applicants: Hyundai Motor Company, Seoul (KR); Kia Corporation, Seoul (KR)

(72) Inventors: Seung Min Jeong, Hwaseong-si (KR); Seung Ho Noh, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 432 days.

(21) Appl. No.: 18/315,154

(22) Filed: May 10, 2023

(65) Prior Publication Data

US 2024/0199132 A1 Jun. 20, 2024

(30) Foreign Application Priority Data

Dec. 14, 2022 (KR) .................. 10-2022-0175035

(51) Int. Cl.
*B62D 25/08* (2006.01)
*B62D 25/18* (2006.01)

(52) U.S. Cl.
CPC .......... *B62D 25/088* (2013.01); *B62D 25/18* (2013.01)

(58) Field of Classification Search
CPC ............ B60G 13/003; B60G 2204/128; B60Y 2306/01; B62D 23/00; B62D 25/088; B62D 25/145
See application file for complete search history.

(56) References Cited

U.S. PATENT DOCUMENTS

| | | | | |
|---|---|---|---|---|
| 4,955,663 | A * | 9/1990 | Imura | B62D 25/082 296/203.02 |
| 11,124,237 | B2 * | 9/2021 | Heo | B62D 21/152 |
| 2006/0006699 | A1 * | 1/2006 | Matsuyama | B62D 25/088 296/203.02 |
| 2009/0001766 | A1 | 1/2009 | Kurata | |
| 2019/0023324 | A1 * | 1/2019 | Sekiya | B62D 25/20 |
| 2020/0180700 | A1 * | 6/2020 | Kim | B62D 27/02 |
| 2021/0214010 | A1 | 7/2021 | Atsumi et al. | |

FOREIGN PATENT DOCUMENTS

| | | |
|---|---|---|
| CN | 110962941 A | 4/2020 |
| JP | 2003182643 A | 7/2003 |
| JP | 2005088732 A | 4/2005 |
| JP | 2005247091 A | 9/2005 |
| JP | 2009006902 A | 1/2009 |
| JP | 2021109588 A | 8/2021 |
| KR | 20040102905 A | 12/2004 |
| KR | 20220126132 A | 9/2022 |

* cited by examiner

*Primary Examiner* — Lori Lyjak
(74) *Attorney, Agent, or Firm* — Slater Matsil, LLP

(57) ABSTRACT

A shock absorber support structure for a monocoque vehicle includes a shock absorber housing disposed at an upper side of a front side member disposed at a front side of a dash panel, a mounting support member coupled to a lower side of a shock absorber mounting part of the shock absorber housing and coupled to face a plurality of dash cross members with the dash panel interposed therebetween, upper arm mounting brackets vertically connecting the mounting support member and the front side member and spaced apart from each other in a forward/rearward direction of a vehicle body, and an upper side member disposed at the upper side of the front side member and elongated in the forward/rearward direction of the vehicle body, the upper side member having a rear end coupled to a front side of the mounting support member.

20 Claims, 13 Drawing Sheets

SUSPENSION SUPPORT STRUCTURE FOR MONOCOQUE VEHICLE

CROSS-REFERENCE TO RELATED APPLICATIONS

This application claims the benefit of Korean Patent Application No. 10-2022-0175035, filed on Dec. 14, 2022, which application is hereby incorporated herein by reference.

TECHNICAL FIELD

The present invention relates to a technology for supporting a front suspension of a monocoque vehicle.

BACKGROUND

A purpose-built vehicle (PBV) refers to a vehicle capable of being configured by a combination of a drive module for driving the vehicle and a life module for defining passenger and loading spaces having various shapes in accordance with the market requirements in order to conform to the market tendency of diversified small-quantity production.

Therefore, there is an advantage in that it is possible to quickly produce a vehicle, which meets the market requirements, only by changing the life module.

In addition, according to the recent tendency toward technologies related to environmentally friendly vehicles, research is being conducted on the technology related to the drive module equipped with a high-voltage battery (hereinafter, simply referred to as a "battery").

An overall length of the PBV tends to comparatively decrease, a wheelbase tends to increase, and a driver seat tends to be disposed maximally forward to improve utilization of an occupancy space for a passenger and reduce costs required to manufacture the PBV.

To comply with the development tendency, a multi-link type suspension is mounted in a monocoque type PBV, and an upper arm of the multi-link type suspension tends to be disposed forward of a dash panel.

The foregoing explained as the background is intended merely to aid in the understanding of the background of embodiments of the present invention, and is not intended to mean that embodiments of the present invention fall within the purview of the related art that is already known to those skilled in the art.

SUMMARY

Embodiments of the present invention can solve problems in the art and provide a suspension support structure for a monocoque vehicle, in which an upper arm with sufficient rigidity may be securely mounted at a front side of a dash panel at the time of mounting a multi-link type suspension in a monocoque type PBV or the like, such that deformation of the dash panel at a rear side of a mounting portion of the upper arm may be minimized even in the event of a frontal collision accident, which makes it possible to sufficiently ensure safety of a driver and a passenger.

An embodiment of the present invention provides a shock absorber support structure for a monocoque vehicle, the shock absorber support structure including a shock absorber housing disposed at an upper side of a front side member disposed at a front side of a dash panel, a mounting support member coupled to a lower side of a shock absorber mounting part of the shock absorber housing and coupled to face a plurality of dash cross members with the dash panel interposed therebetween, upper arm mounting brackets configured to vertically connect the mounting support member and the front side member and disposed to be spaced apart from each other in a forward/rearward direction of a vehicle, and an upper side member disposed at the upper side of the front side member and elongated in a forward/rearward direction of a vehicle body, the upper side member having a rear end coupled to a front side of the mounting support member.

The mounting support member may include a mounting support inner member disposed inside the vehicle body based on a mounting hole of the shock absorber mounting part and provided to have a closed cross-section defined by the shock absorber housing and elongated in the forward/rearward direction of the vehicle body and a mounting support outer member disposed outside the vehicle body based on the mounting hole and provided to have a closed cross-section defined by the shock absorber housing and elongated in the forward/rearward direction of the vehicle body.

The plurality of dash cross members may include a dash cross upper member provided at a relatively upper side, a dash cross middle member provided at a lower side of the dash cross upper member, and a dash cross lower member provided at a lower side of the dash cross middle member and disposed at a connection portion between the dash panel and a floor panel.

A rear end of the mounting support inner member may be coupled to face the dash cross middle member with the dash panel interposed therebetween.

A rear end of the mounting support outer member may be coupled to face the dash cross upper member with the dash panel interposed therebetween.

A rear end of the mounting support inner member may be coupled to face the dash cross upper member and the dash cross middle member with the dash panel interposed therebetween.

The rear end of the upper side member may be coupled to a front side of the mounting support outer member.

A closed cross-section of the upper side member, which is defined by the upper side member, may have a shape elongated in the forward/rearward direction of the vehicle body, and the closed cross-section defined by the upper side member may be disposed to be aligned with a closed cross-section defined by the mounting support outer member and the shock absorber housing.

A front side member support, which connects the upper side member to the front side member at the lower side, may be coupled to a front side of the upper side member, and a front back beam may be coupled to a front side of the front side member support.

A mounting flange portion may be integrated with the mounting support member and surround a mounting hole of the shock absorber mounting part.

Another embodiment of the present invention provides a shock absorber support structure for a monocoque vehicle, the shock absorber support structure including a wheel housing coupled to an upper side of a front side member, a shock absorber housing provided at an upper side of the wheel housing, a mounting support member coupled to a lower side of the shock absorber housing while defining a closed cross-section, an upper arm mounting bracket disposed while vertically connecting the mounting support member and the front side member, an upper side member coupled to a front side of the mounting support member, provided at the upper side of the front side member, and elongated in a forward/rearward direction of a vehicle body, a dash panel coupled to a rear side of the mounting support member, and one or more dash cross members coupled to face the mounting support member with the dash panel interposed therebetween.

A shock absorber mounting part of the shock absorber housing may have a mounting hole, and the mounting support member may have a mounting flange portion that surrounds a periphery of the mounting hole.

The mounting support member may include a mounting support inner member disposed inside the vehicle body based on the mounting hole provided in the shock absorber mounting part of the shock absorber housing and provided to have a closed cross-section defined by the shock absorber housing and elongated in the forward/rearward direction of the vehicle body; and a mounting support outer member disposed outside the vehicle body based on the mounting hole and provided to have a closed cross-section defined by the shock absorber housing and elongated in the forward/rearward direction of the vehicle body.

The mounting flange portion having an arc shape may be formed on the mounting support inner member.

The mounting support inner member may be coupled to face a dash cross upper member and a dash cross middle member at a lower side of the dash cross upper member with the dash panel interposed therebetween, a dash cross lower member may be provided at a lower side of the dash cross middle member and installed at a portion where the dash panel and a floor panel are connected, and the dash cross upper member, the dash cross middle member, and the dash cross lower member may be disposed in parallel with one another.

The mounting support outer member may be coupled to face the dash cross upper member with the dash panel interposed therebetween.

The mounting support inner member may be coupled to face a dash cross middle member with the dash panel interposed therebetween, a dash cross upper member may be provided at an upper side of the dash cross middle member, a dash cross lower member may be provided at a lower side of the dash cross middle member and installed at a portion where the dash panel and a floor panel are connected, and the dash cross upper member, the dash cross middle member, and the dash cross lower member may be disposed in parallel with one another.

The mounting support outer member may be coupled to face the dash cross upper member with the dash panel interposed therebetween.

A front side member support, which connects the upper side member to the front side member at the lower side, may be coupled to a front side of the upper side member, and a front back beam may be coupled to a front side of the front side member support.

The mounting support member may be coupled to be in surface contact with the wheel housing.

According to embodiments of the present invention, the upper arm with sufficient rigidity may be securely mounted at the front side of the dash panel at the time of mounting the multi-link type suspension in the monocoque type PBV or the like, such that deformation of the dash panel at the rear side of the mounting portion of the upper arm may be minimized even in the event of a frontal collision accident, which makes it possible to sufficiently ensure safety of the driver and the passenger.

DETAILED DESCRIPTION OF ILLUSTRATIVE EMBODIMENTS

Hereinafter, embodiments disclosed in the present specification will be described in detail with reference to the accompanying drawings. The same or similar constituent elements are assigned with the same reference numerals regardless of the figure, and the repetitive description thereof will be omitted.

The suffixes "module," "unit", "part", and "portion" used to describe constituent elements in the following description are used together or interchangeably in order to facilitate the description, but the suffixes themselves do not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present invention.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

Referring to FIGS. 1 to 13, a suspension support structure for a monocoque vehicle according to embodiments of the present invention includes a shock absorber housing disposed at an upper side of a front side member 3 disposed at a front side of a dash panel 1, a mounting support member 11 coupled to a lower side of a shock absorber mounting part 7 of the shock absorber housing 5 and coupled to face a plurality of dash cross members with the dash panel 1 interposed therebetween, upper arm mounting brackets 13 configured to vertically connect the mounting support member 11 and the front side member 3 and disposed to be spaced apart from each other in a forward/rearward direction of the vehicle, and an upper side member 15 disposed at the upper side of the front side member 3 and elongated in the forward/rearward direction of a vehicle body, the upper side member 15 having a rear end coupled to a front side of the mounting support member 11.

That is, an upper end of a shock absorber 17 disposed at a front side of the vehicle is coupled to the shock absorber mounting part 7 of the shock absorber housing 5. An upper arm 19, which constitutes a suspension system and is supported by the vehicle body while surrounding a periphery of the shock absorber 17, is supported by the vehicle body through the upper arm mounting bracket 13. An upper side of the upper arm mounting bracket 13 is supported by the mounting support member 11, and a lower side of the upper arm mounting bracket 13 is supported by the front side member 3, such that the mounting support member 11 is disposed by the upper side member 15 at the front side and the dash panel 1 and the plurality of dash cross members 9 at the rear side.

Therefore, because the upper arm 19 with sufficient rigidity is securely mounted at the front side of the dash panel 1, deformation of the dash panel 1 at a rear side of a mounting part of the upper arm 19 may be minimized even in the event of a frontal collision accident or the like. Therefore, it is possible to sufficiently ensure safety of a driver and a passenger.

Figure 1:
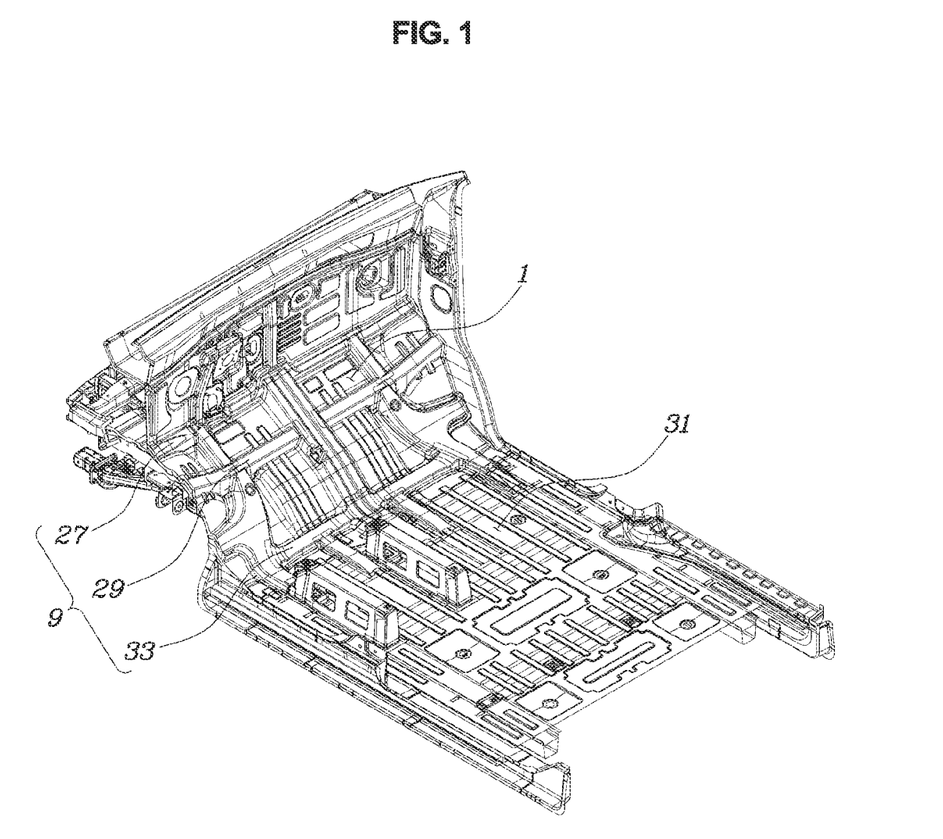
FIG. 1 is a view illustrating a partial structure of a vehicle body to which an embodiment of the present invention is applied.
Figure 2:
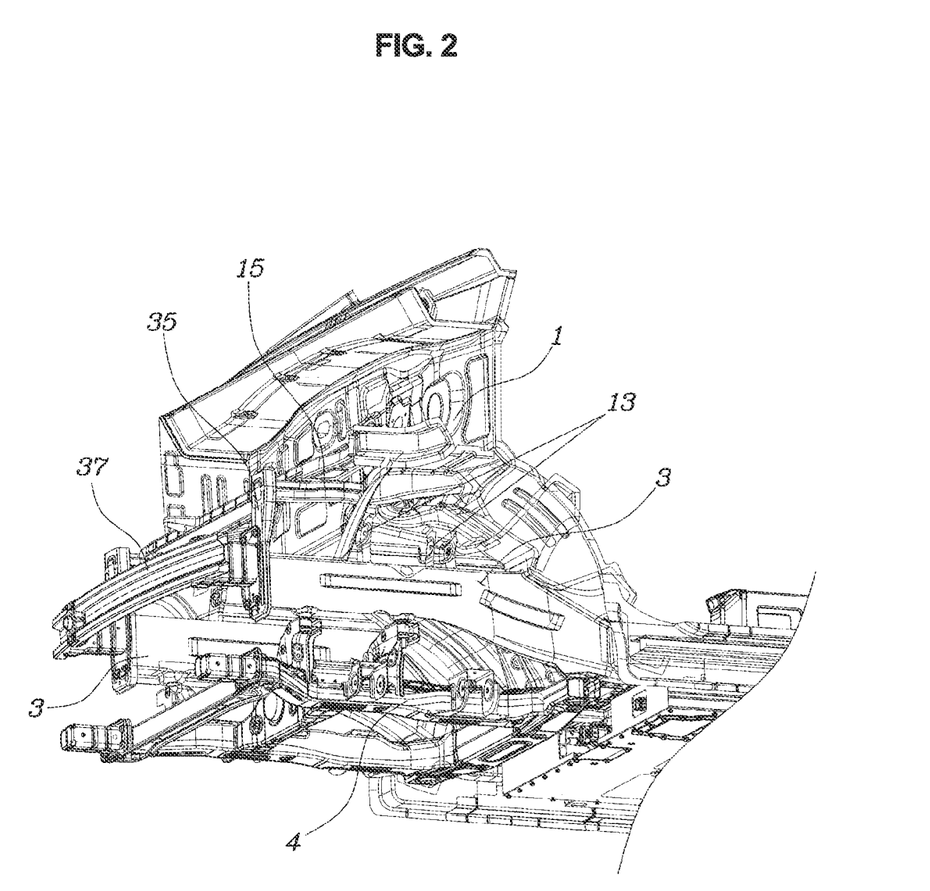
FIG. 2 is a view illustrating the vehicle body in FIG. 1 when the vehicle body is viewed from the front lower side.
Figure 3:
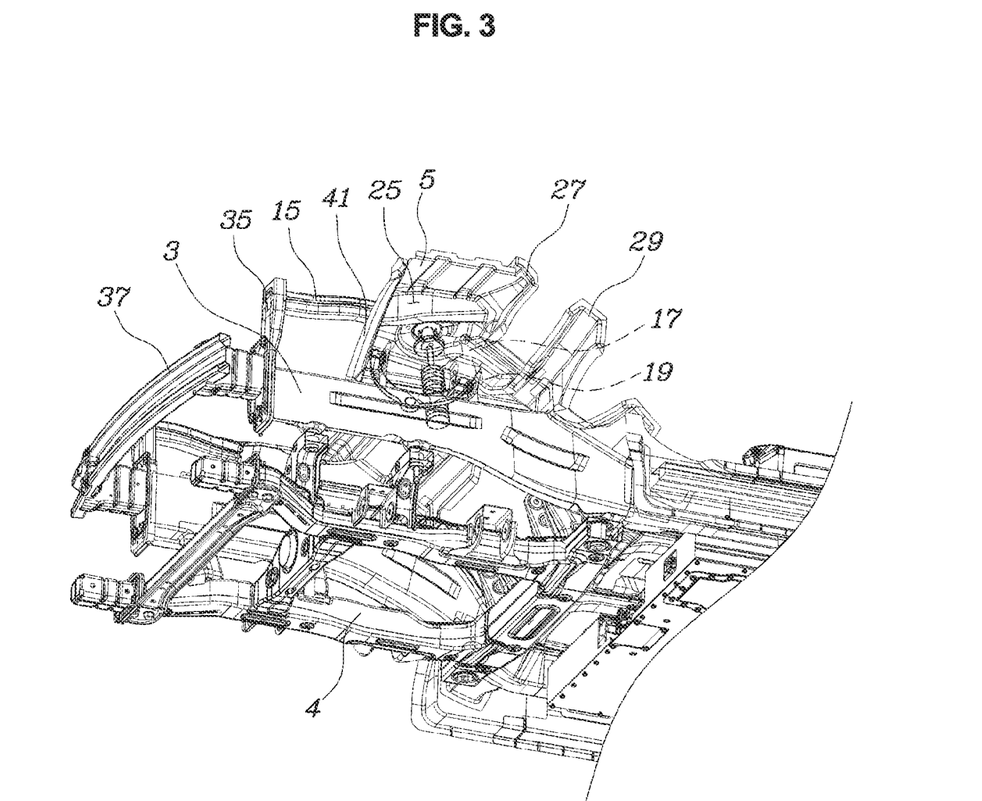
FIG. 3 is a view illustrating a state in which a dash panel in FIG. 2 is removed.
Figure 4:
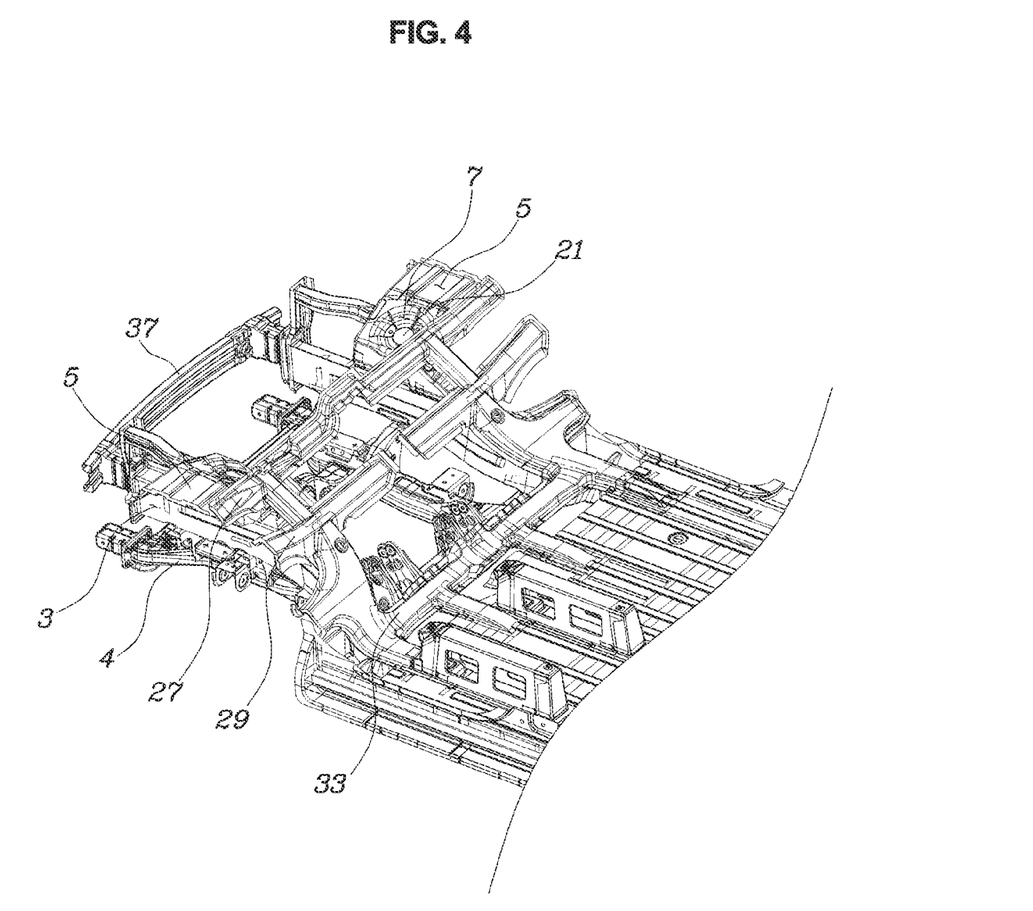
FIG. 4 is a view illustrating the state in FIG. 3 when viewed from above.
Figure 5:
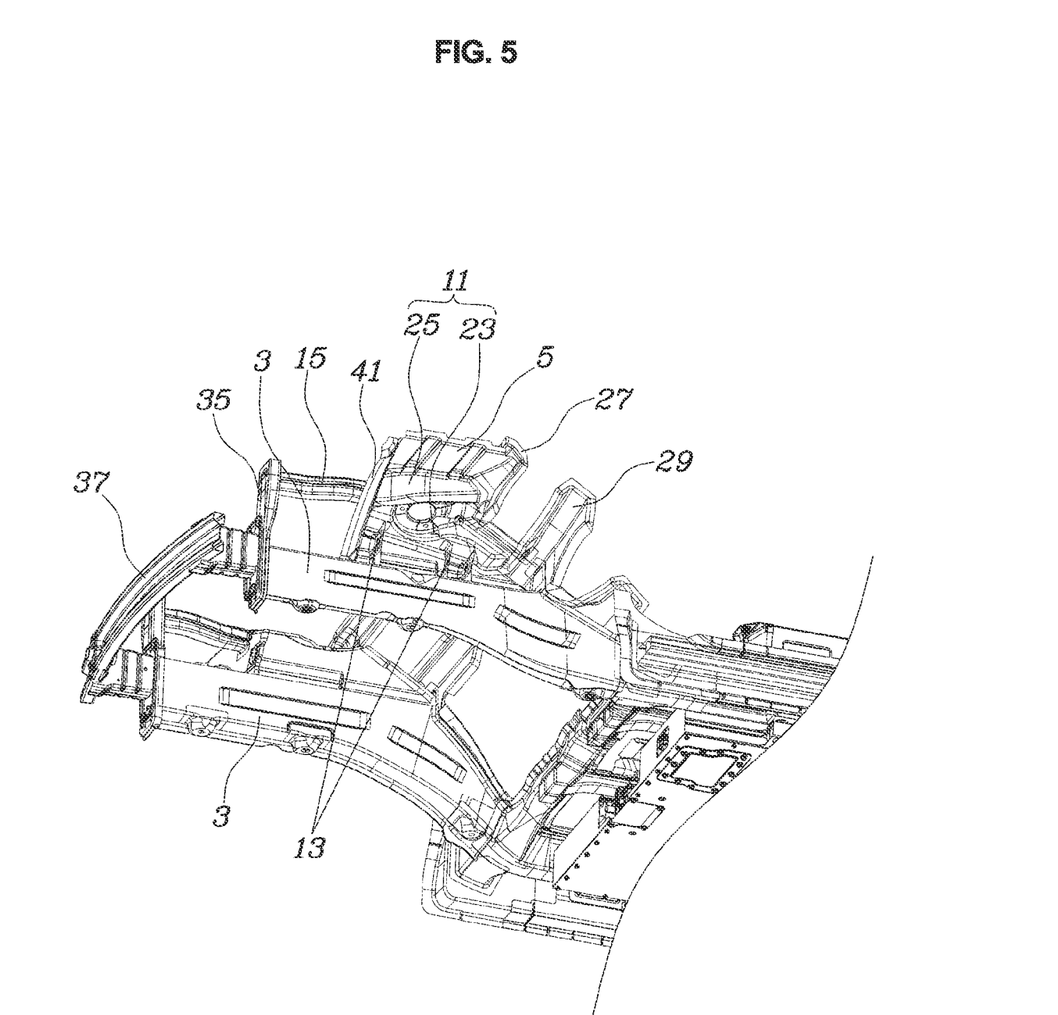
FIG. 5 is a view illustrating a state in which a front side member is removed from the state in FIG. 3.
Figure 6:
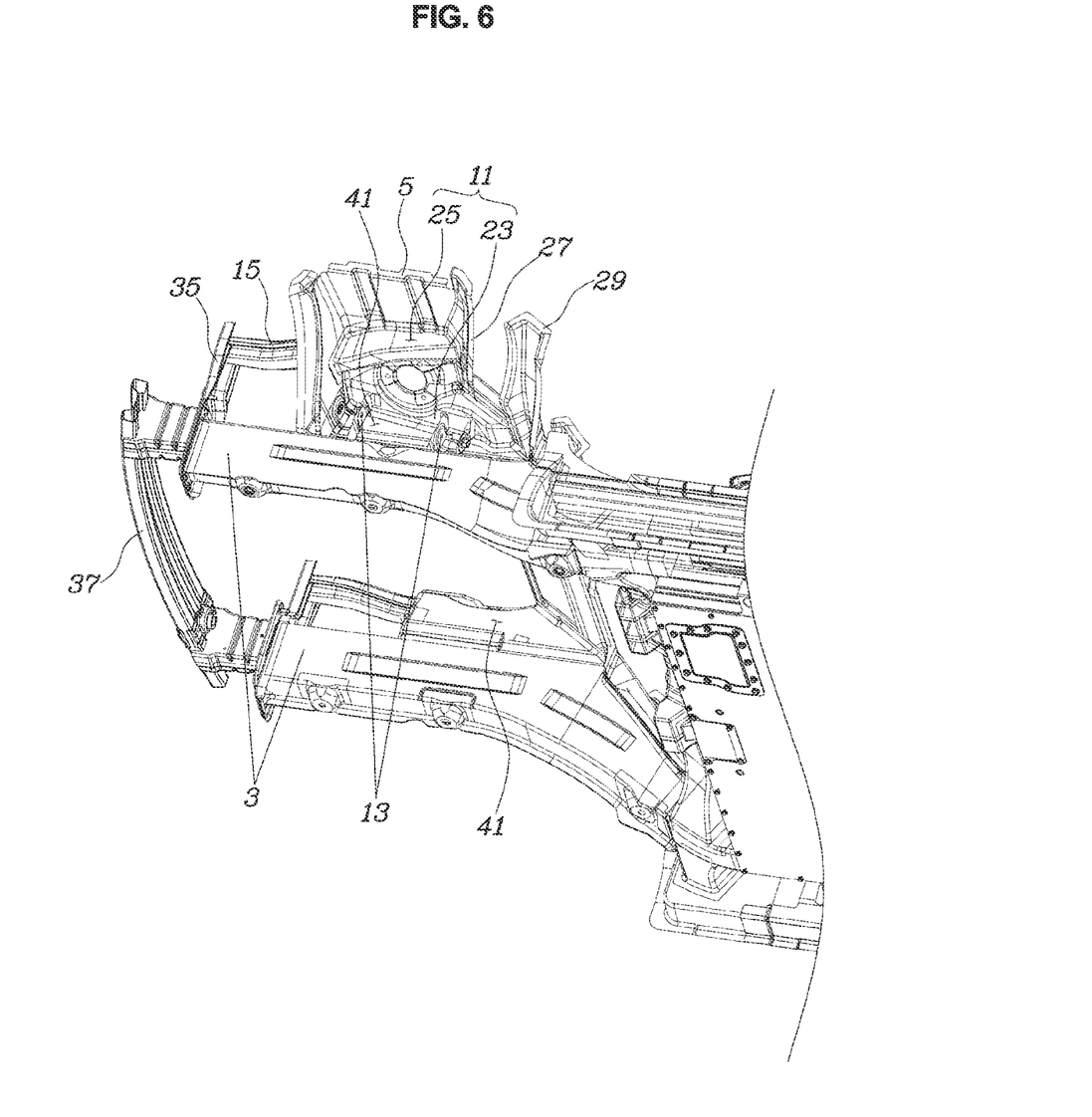
FIG. 6 is a view illustrating FIG. 5 when viewed in another angle.
Figure 7:
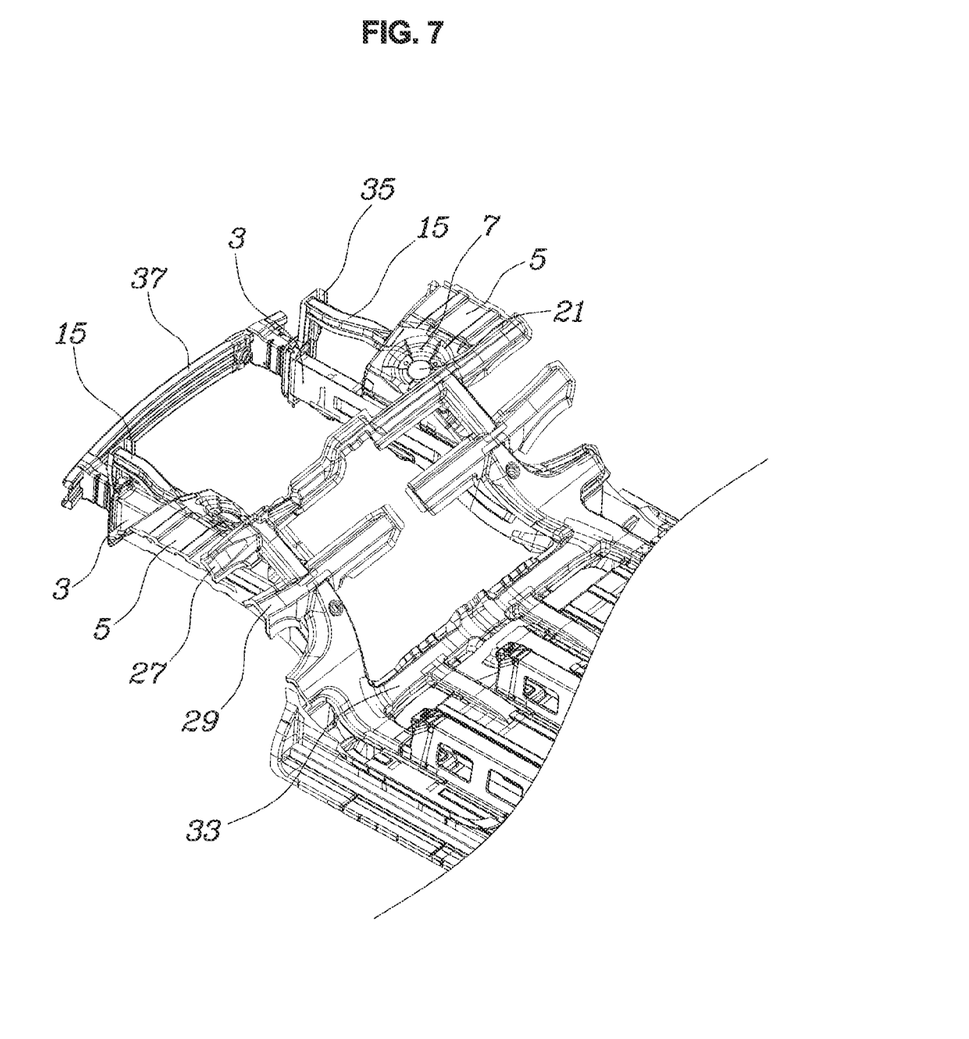
FIG. 7 is a view illustrating the state in FIG. 5 when viewed from above.
Figure 8:
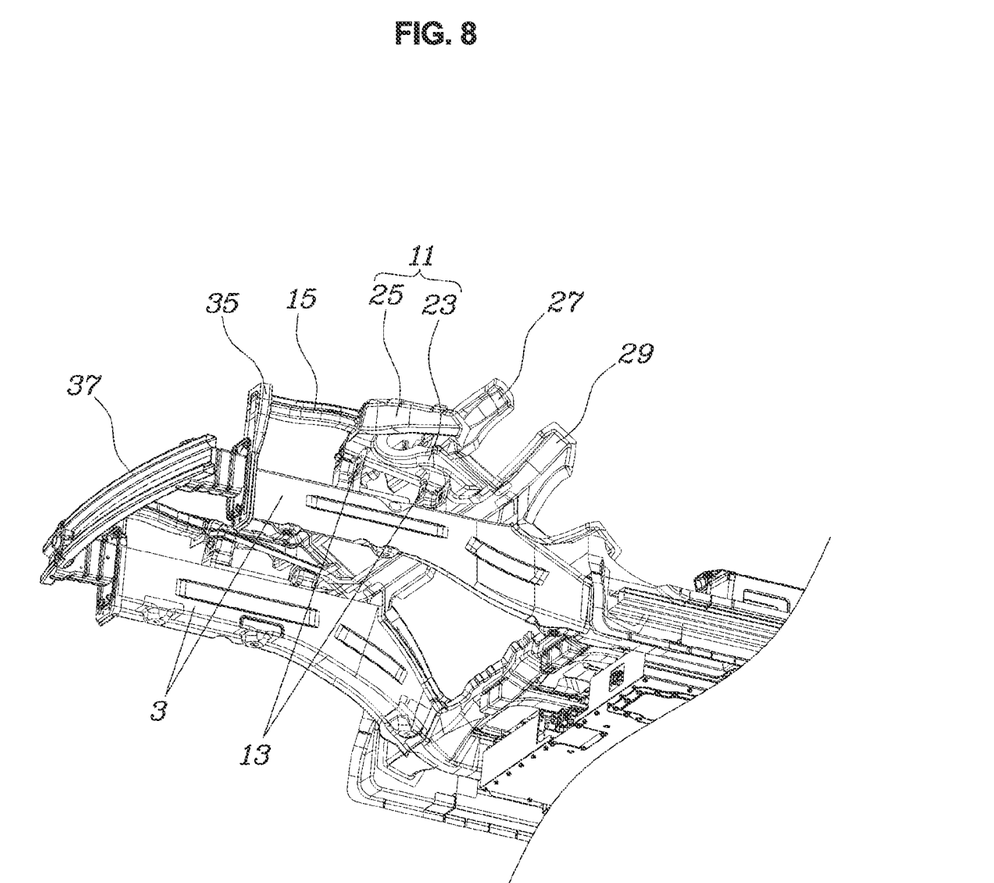
FIG. 8 is a view illustrating a state in which a wheel housing and a shock absorber housing are removed from the state in FIG. 5.
Figure 9:
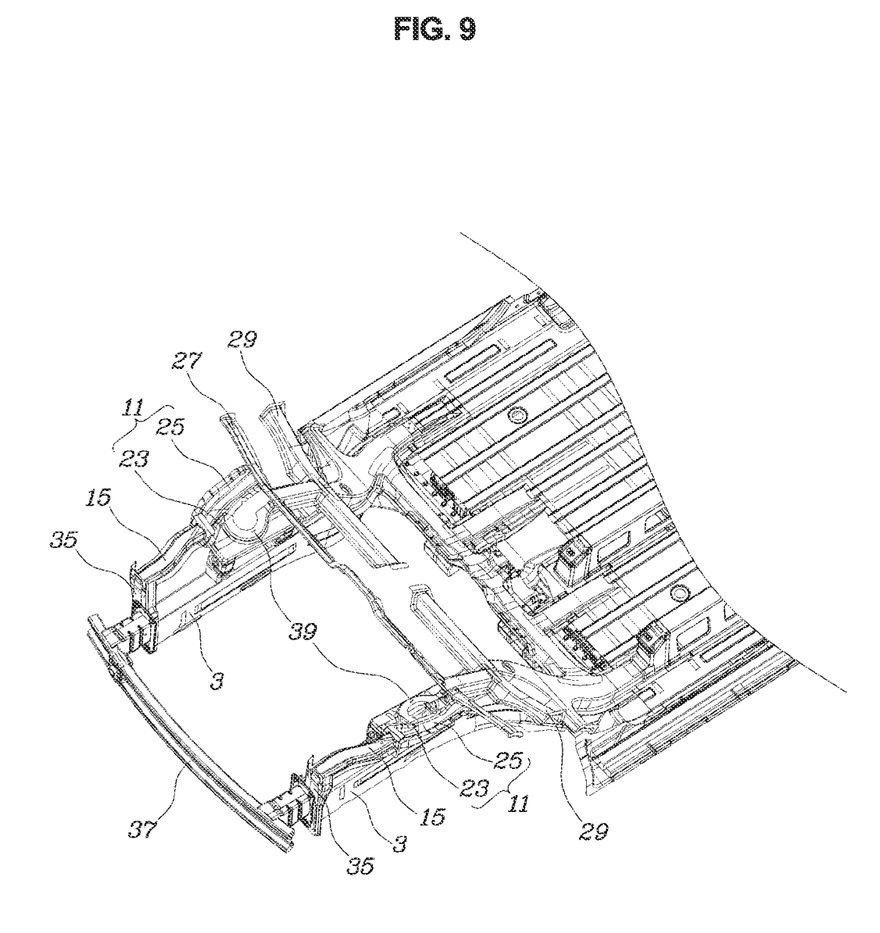
FIG. 9 is a view illustrating the state in FIG. 8 when viewed from above.
Figure 10:
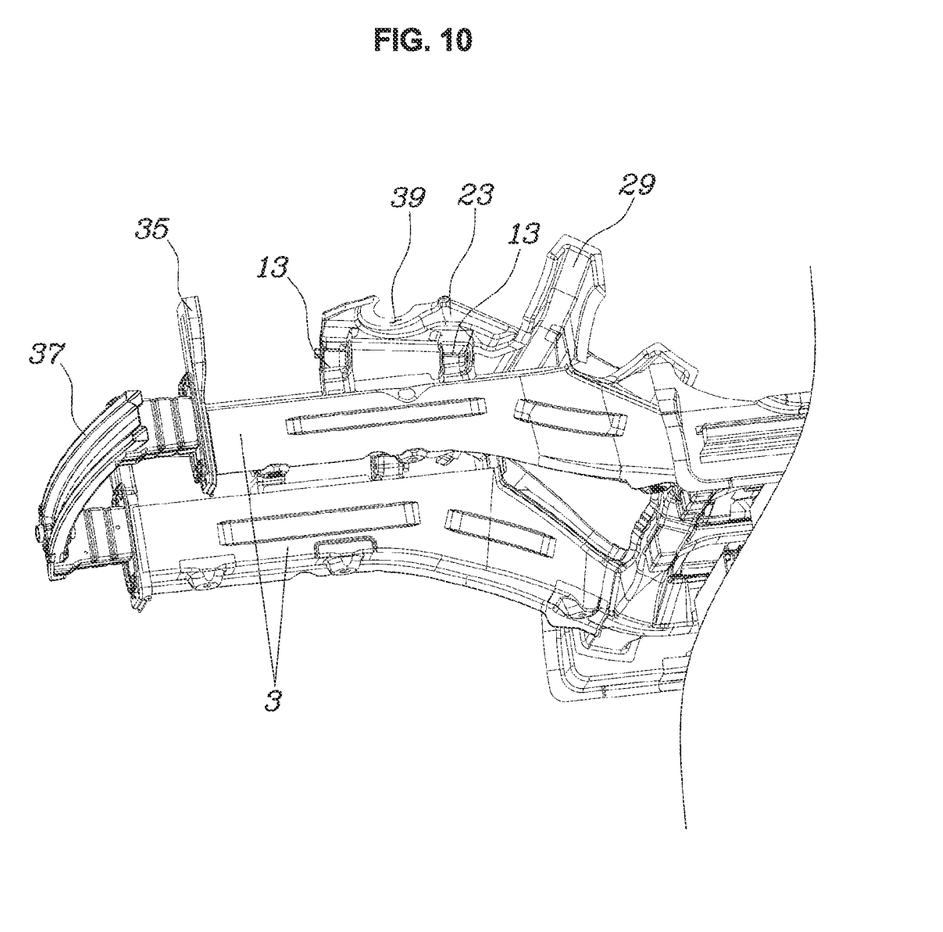
FIG. 10 is a view illustrating a state in which some components are further removed from the state in FIG. 8.
Figure 11:
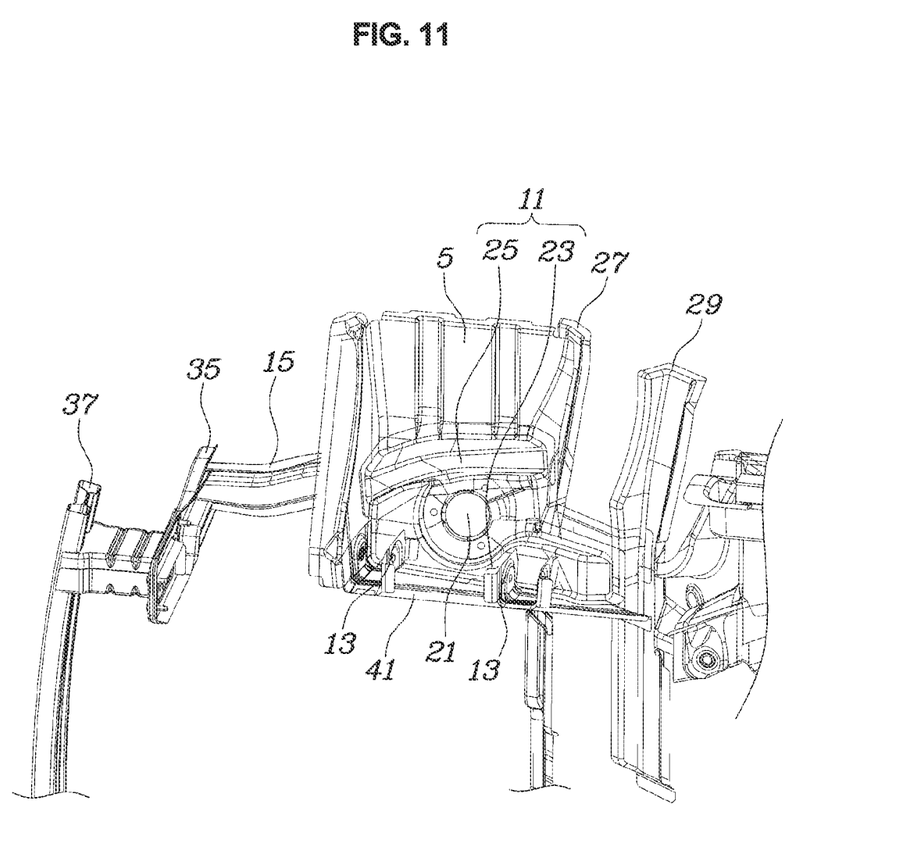
FIG. 11 is a view illustrating a state in which the front side member is removed from the state in FIG. 5 when viewed from below the vehicle body.
Figure 12:
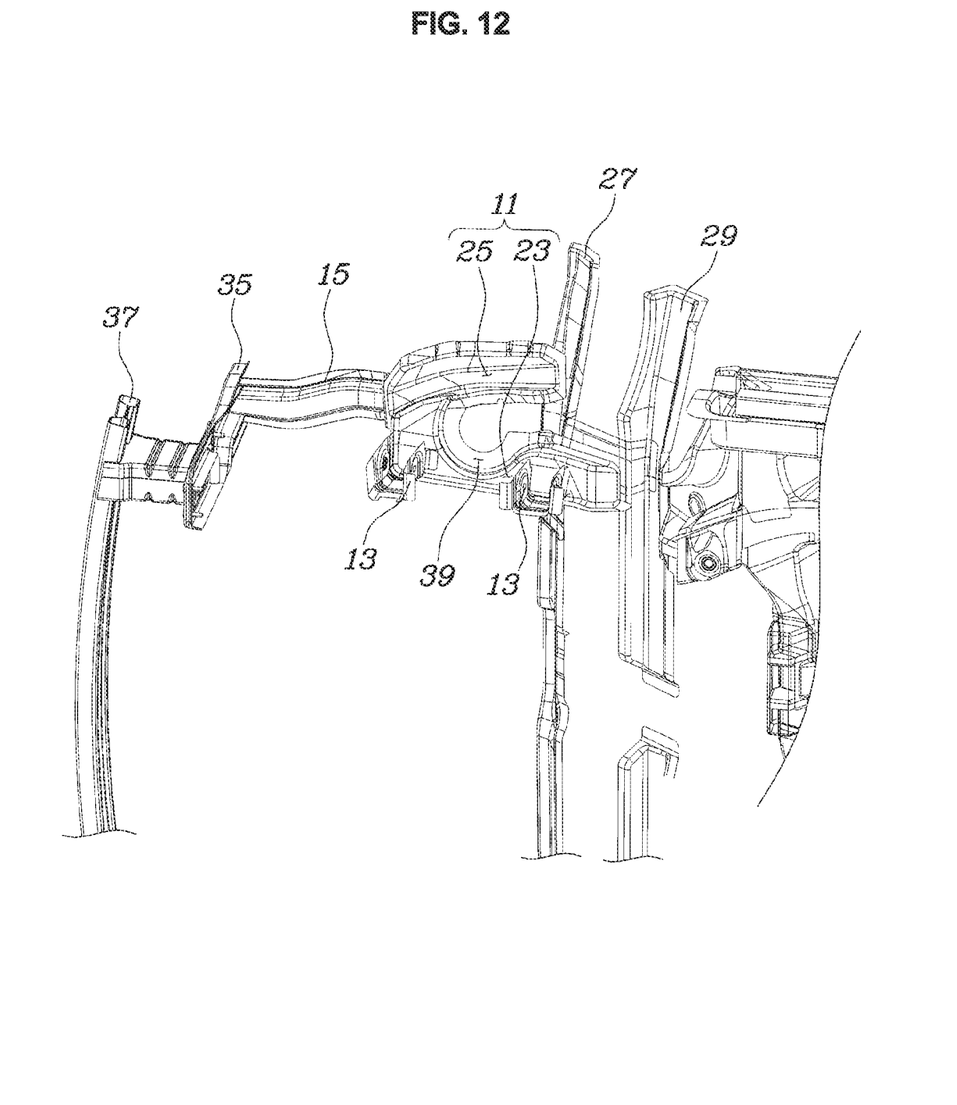
FIG. 12 is a view illustrating a state in which the wheel housing and the shock absorber housing are removed from the state in FIG. 11.

For reference, FIG. 1 illustrates a configuration in which an upper side of the dash panel 1 is connected to a front side of a floor panel 31. FIG. 2 illustrates that a sub-frame 4 is mounted at a lower side of the front side member 3 to mount a power device for a vehicle.

In the embodiment illustrated in FIGS. 1 to 12, the mounting support member 11 may include a mounting support inner member 23 disposed inside the vehicle body based on a mounting hole 21 of the shock absorber mounting part 7 and provided to have a closed cross-section defined by the shock absorber housing 5 and elongated in the forward/rearward direction of the vehicle body, and a mounting support outer member 25 disposed outside the vehicle body based on the mounting hole 21 and provided to have a closed cross-section defined by the shock absorber housing 5 and elongated in the forward/rearward direction of the vehicle body.

Figure 13:
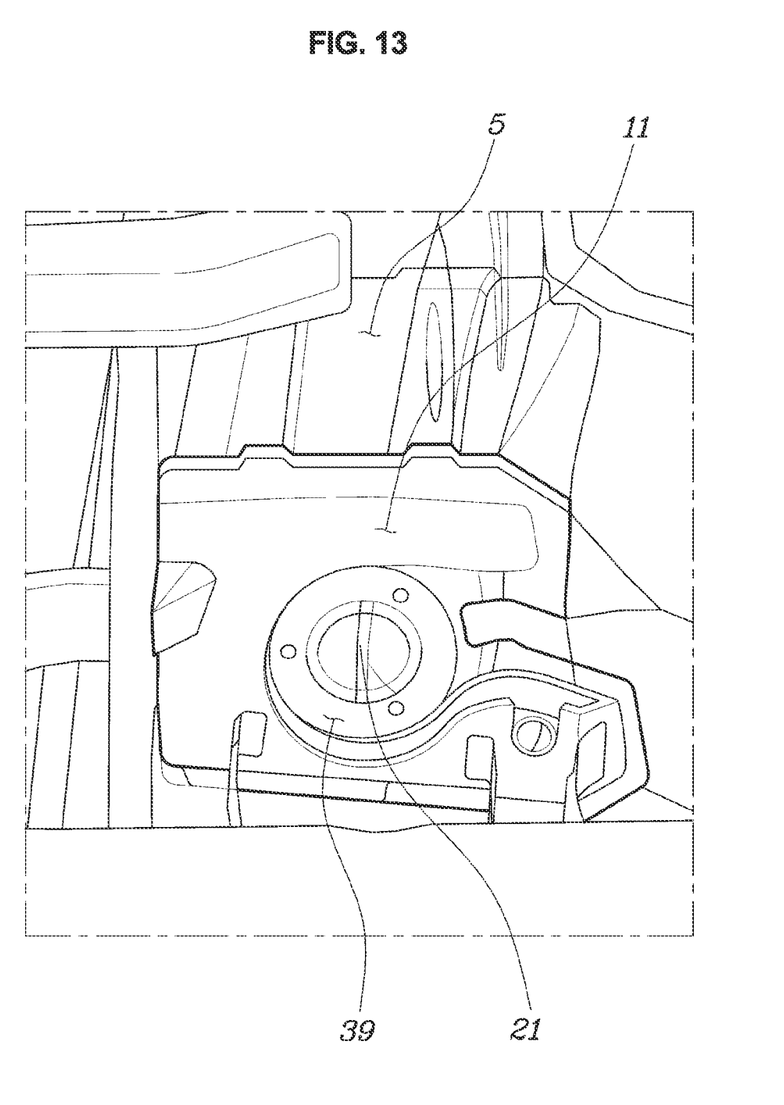
FIG. 13 is a view illustrating another embodiment of the present invention.

Alternatively, in the embodiment illustrated in FIG. 13, the mounting support member 11 may be configured as a single component.

Therefore, as described above, the upper side of the upper arm mounting bracket 13 has the closed cross-section having a shape extending in the forward/rearward direction of the vehicle body and is supported by the mounting support member 11 that ensures high rigidity. The upper side member 15 is connected to the front side of the mounting support member 11, and the dash panel 1 and the plurality of dash cross members 9 are connected to a rear side of the mounting support member 11, which makes it possible to effectively support impact applied from the front side of the vehicle.

Meanwhile, the plurality of dash cross members 9 includes a dash cross upper member 27 provided at a relatively upper side, a dash cross middle member 29 provided at a lower side of the dash cross upper member 27, and a dash cross lower member 33 provided at a lower side of the dash cross middle member 29 and disposed at a connection portion between the dash panel 1 and the floor panel 31.

A rear end of the mounting support inner member 23 is coupled to face the dash cross middle member 29 with the dash panel 1 interposed therebetween.

In addition, a rear end of the mounting support outer member 25 is coupled to face the dash cross upper member 27 with the dash panel 1 interposed therebetween.

In particular, in the present embodiment, the rear end of the mounting support inner member 23 is coupled to face not only the dash cross middle member 29 but also the dash cross upper member 27 with the dash panel 1 interposed therebetween, which makes it possible to more securely support an impact force inputted from the front side through the mounting support inner member 23.

A rear end of the upper side member 15 is coupled to a front side of the mounting support outer member 25.

A closed cross-section of the upper side member 15, which is defined by the upper side member 15, has a shape elongated in the forward/rearward direction of the vehicle body. The closed cross-section defined by the upper side member 15 is disposed to be aligned with a closed cross-section defined by the mounting support outer member 25 and the shock absorber housing 5.

Therefore, the impact force, which is inputted in the forward/rearward direction of the vehicle body through the upper side member 15, may be effectively supported by the mounting support outer member 25.

A front side member support 35, which connects the upper side member 15 to the front side member 3 at the lower side, is coupled to a front side of the upper side member 15, and a front back beam 37 is coupled to a front side of the front side member support 35.

Therefore, an impact load, which is inputted through the front back beam 37 in the event of a frontal collision accident of the vehicle, is not only supported by the front side member 3 at the lower side but also supported and dispersed by the upper side member 15 at the upper side and the mounting support outer member 25.

Meanwhile, a mounting flange portion 39 is integrated with the mounting support member 11 and surrounds a periphery of the mounting hole 21 of the shock absorber mounting part 7.

Therefore, the mounting flange portion 39 may be used to securely support the upper end of the shock absorber 17.

In addition, embodiments of the present invention, which have been described above, may be expressed as follows.

That is, the suspension support structure for a monocoque vehicle according to an embodiment of the present invention includes a wheel housing 41 coupled to the upper side of the front side member 3, the shock absorber housing 5 provided at an upper side of the wheel housing 41, the mounting support member 11 coupled to a lower side of the shock absorber housing 5 while defining a closed cross-section, the upper arm mounting bracket 13 disposed while vertically connecting the mounting support member 11 and the front side member 3, the upper side member 15 coupled to the front side of the mounting support member 11, provided at the upper side of the front side member 3, and elongated in the forward/rearward direction of the vehicle body, the dash panel 1 coupled to the rear side of the mounting support member 11, and the one or more dash cross members 9 coupled to face the mounting support member 11 with the dash panel 1 interposed therebetween.

The shock absorber mounting part 7 of the shock absorber housing 5 may have the mounting hole 21, and the mounting support member 11 may have the mounting flange portion 39 that surrounds the periphery of the mounting hole 21.

The mounting support member 11 may include the mounting support inner member 23 disposed inside the vehicle body based on the mounting hole 21 provided in the shock absorber mounting part 7 of the shock absorber housing 5 and provided to have the closed cross-section defined by the shock absorber housing 5 and elongated in the forward/rearward direction of the vehicle body and the mounting support outer member 25 disposed outside the vehicle body based on the mounting hole 21 and provided to have the closed cross-section defined by the shock absorber housing 5 and elongated in the forward/rearward direction of the vehicle body.

The mounting flange portion 39 may be formed in an arc shape on the mounting support inner member 23.

The mounting support inner member 23 is coupled to face the dash cross upper member 27 and the dash cross middle member 29 at the lower side of the dash cross upper member 27 with the dash panel 1 interposed therebetween. The dash cross lower member 33 is provided at the lower side of the dash cross middle member 29 and installed at a portion where the dash panel 1 and the floor panel 31 are connected. The dash cross upper member 27, the dash cross middle member 29, and the dash cross lower member 33 may be disposed in parallel with one another.

The mounting support outer member 25 may be coupled to face the dash cross upper member 27 with the dash panel 1 interposed therebetween.

The mounting support inner member 23 may be coupled to face the dash cross middle member 29 with the dash panel 1 interposed therebetween. The dash cross upper member 27 may be provided at an upper side of the dash cross middle member 29. The dash cross lower member 33 may be provided at the lower side of the dash cross middle member 29 and installed at the portion where the dash panel 1 and the floor panel 31 are connected. The dash cross upper member 27, the dash cross middle member 29, and the dash cross lower member 33 may be disposed in parallel with one another.

Even in this case, the mounting support outer member 25 may be coupled to face the dash cross upper member 27 with the dash panel 1 interposed therebetween.

The front side member support 35, which connects the upper side member 15 to the front side member 3 at the lower side, may be coupled to the front side of the upper side member 15. The front back beam 37 may be coupled to the front side of the front side member support 35.

The mounting support member 11 may be coupled to be in surface contact with the wheel housing 41. Therefore, upper and lower sides of the mounting support member 11 are supported by the mounting support member 11 and the front side member 3, and a middle portion of the mounting support member 11 is supported by the wheel housing 41, which makes it possible to ensure higher rigidity.

While the specific embodiments of the present invention have been illustrated and described, it will be obvious to those skilled in the art that the present invention may be variously modified and changed without departing from the technical spirit of the present invention defined in the appended claims.

What is claimed is:

1. A shock absorber support structure for a monocoque vehicle, the structure comprising:
   a shock absorber housing disposed at an upper side of a front side member disposed at a front side of a dash panel;
   a mounting support member coupled to a lower side of a shock absorber mounting part of the shock absorber housing and coupled to face a plurality of dash cross members with the dash panel interposed therebetween;
   upper arm mounting brackets vertically connecting the mounting support member and the front side member and spaced apart from each other in a forward/rearward direction of a vehicle body; and
   an upper side member disposed at the upper side of the front side member and elongated in the forward/rearward direction of the vehicle body, the upper side member having a rear end coupled to a front side of the mounting support member.

2. The structure of claim 1, wherein the mounting support member comprises:
   a mounting support inner member disposed inside the vehicle body based on a mounting hole of the shock absorber mounting part and having a closed cross-section defined by the shock absorber housing and elongated in the forward/rearward direction of the vehicle body; and
   a mounting support outer member disposed outside the vehicle body based on the mounting hole and having the closed cross-section defined by the shock absorber housing and elongated in the forward/rearward direction of the vehicle body.

3. The structure of claim 2, wherein the plurality of dash cross members comprises:
   a dash cross upper member provided at a relatively upper side;
   a dash cross middle member provided at a lower side of the dash cross upper member; and
   a dash cross lower member provided at a lower side of the dash cross middle member and disposed at a connection portion between the dash panel and a floor panel.

4. The structure of claim 3, wherein a rear end of the mounting support inner member is coupled to face the dash cross middle member with the dash panel interposed therebetween.

5. The structure of claim 4, wherein a rear end of the mounting support outer member is coupled to face the dash cross upper member with the dash panel interposed therebetween.

6. The structure of claim 3, wherein a rear end of the mounting support inner member is coupled to face the dash cross upper member and the dash cross middle member with the dash panel interposed therebetween.

7. The structure of claim 2, wherein the rear end of the upper side member is coupled to a front side of the mounting support outer member.

8. The structure of claim 7, wherein:
a closed cross-section of the upper side member defined by the upper side member has a shape elongated in the forward/rearward direction of the vehicle body; and
the closed cross-section defined by the upper side member is aligned with a closed cross-section defined by the mounting support outer member and the shock absorber housing.

9. The structure of claim 7, wherein:
a front side member support connecting the upper side member to the front side member at the lower side is coupled to a front side of the upper side member; and
a front back beam is coupled to a front side of the front side member support.

10. The structure of claim 1, further comprising a mounting flange portion integrated with the mounting support member and surrounding a mounting hole of the shock absorber mounting part.

11. A shock absorber support structure for a monocoque vehicle, the structure comprising:
a wheel housing coupled to an upper side of a front side member;
a shock absorber housing at an upper side of the wheel housing;
a mounting support member coupled to a lower side of the shock absorber housing and defining a closed cross-section;
an upper arm mounting bracket vertically connecting the mounting support member and the front side member;
an upper side member coupled to a front side of the mounting support member, provided at the upper side of the front side member, and elongated in a forward/rearward direction of a vehicle body;
a dash panel coupled to a rear side of the mounting support member; and
a dash cross member coupled to face the mounting support member with the dash panel interposed therebetween.

12. The structure of claim 11, wherein:
a shock absorber mounting part of the shock absorber housing has a mounting hole; and
the mounting support member has a mounting flange portion that surrounds a periphery of the mounting hole.

13. The structure of claim 12, wherein the mounting support member comprises:
a mounting support inner member disposed inside the vehicle body based on the mounting hole provided in the shock absorber mounting part of the shock absorber housing and having a closed cross-section defined by the shock absorber housing and elongated in the forward/rearward direction of the vehicle body; and
a mounting support outer member disposed outside the vehicle body based on the mounting hole and having the closed cross-section defined by the shock absorber housing and elongated in the forward/rearward direction of the vehicle body.

14. The structure of claim 13, wherein the mounting flange portion has an arc shape and is disposed on the mounting support inner member.

15. The structure of claim 13, wherein:
the dash cross member comprises a dash cross upper member, a dash cross middle member, and a dash cross lower member disposed in parallel with each other;
the mounting support inner member is coupled to face the dash cross upper member and the dash cross middle member at a lower side of the dash cross upper member with the dash panel interposed therebetween; and
the dash cross lower member is provided at a lower side of the dash cross middle member and installed at a portion where the dash panel and a floor panel are connected.

16. The structure of claim 15, wherein the mounting support outer member is coupled to face the dash cross upper member with the dash panel interposed therebetween.

17. The structure of claim 13, wherein:
the dash cross member comprises a dash cross upper member, a dash cross middle member, and a dash cross lower member disposed in parallel with each other;
the mounting support inner member is coupled to face the dash cross middle member with the dash panel interposed therebetween;
the dash cross upper member is provided at an upper side of the dash cross middle member; and
the dash cross lower member is provided at a lower side of the dash cross middle member and installed at a portion where the dash panel and a floor panel are connected.

18. The structure of claim 17, wherein the mounting support outer member is coupled to face the dash cross upper member with the dash panel interposed therebetween.

19. The structure of claim 11, further comprising:
a front side member support connecting the upper side member to the front side member at the lower side and coupled to a front side of the upper side member; and
a front back beam coupled to a front side of the front side member support.

20. The structure of claim 11, wherein the mounting support member is coupled to be in surface contact with the wheel housing.

* * * * *